United States Patent Office 3,405,279
Patented Oct. 8, 1968

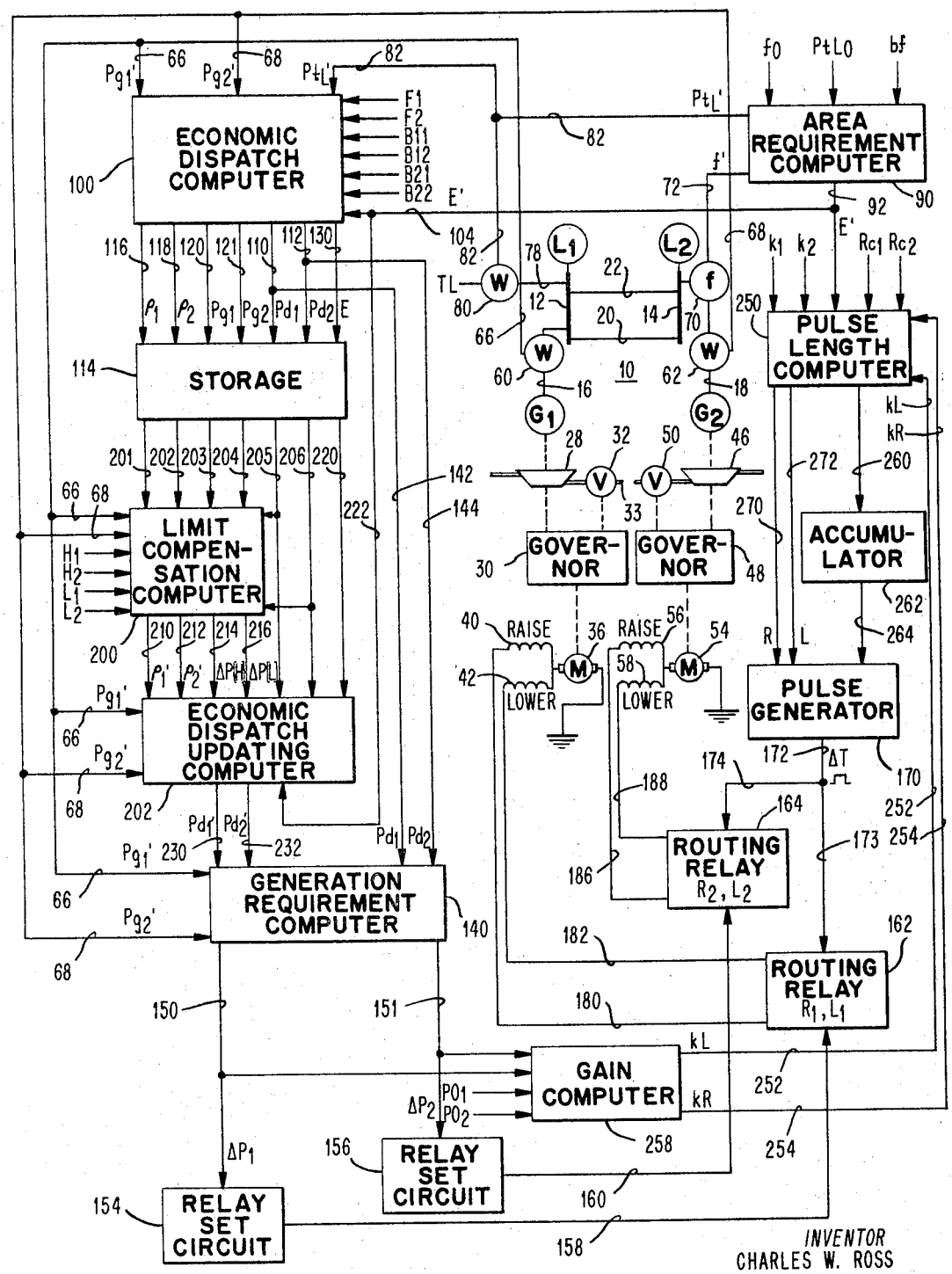

3,405,279
DIGITAL POWER GENERATION
CONTROL SYSTEM
Charles W. Ross, Hatboro, Pa., assignor to Leeds &
Northrup Company, a corporation of Pennsylvania
Filed June 4, 1965, Ser. No. 461,407
12 Claims. (Cl. 307—29)

ABSTRACT OF THE DISCLOSURE

A control system for controlling the distribution of load among a plurality of generating sources from periodic complete economic dispatch calculations of the desired generation for each source and controlling between said periods based upon an updating of the previous calculations when the load change in the system exceeds a certain value. The updated calculation is based upon the changes in load and source production costs. Also, the magnitude of the control signals for changing source outputs are related to the capacity of the sources which can be controlled in the desired direction.

---

This invention relates to means for determining the economic distribution of load among a plurality of sources, such as generators for the production of electric power. This invention is more particularly directed to a digital system which provides a new and novel means for computing the desired generation for each of the sources connected to make up the power distribution network and for effecting control of the output of each of the sources in accordance with the desired generation values computed.

Some power systems have found it advantageous to utilize digital computation and control systems for the regulation of their power systems because of the great amount of flexibility which is inherent in digital computation and control and also because they desire to utilize the flexibility of the digital computer to make calculations not specifically related to the immediate problem of economically distributing the load of the networks. In some instances it has been found advantageous to use the digital computation facility for studying optimum approaches for future development and expansion of a particular power system and other similar purposes. Such studies can be carried out on the computer during time periods when the computer is not in service for the specific job of computing and controlling the power system or network.

Digital computation and control systems utilized in the past have been seriously limited as to the amount of time which is available for the performance of computation other than those required for control of the network. In order to maintain the size of the computers as small as possible and to still obtain a maximum amount of time for study purposes, it is desirable that the time utilized for the computation and effecting of the control actions necessary to economically distribute the load of a network among a plurality of sources should be maintained reasonably small.

It is therefore an object of this invention to provide an improved digital control system for power distribution networks.

A further object of this invention is the provision of a digital control system for the maintenance of an economic distribution of the load of a power network among the sources providing power to that network while using less computer time than prior art systems.

A still further object of this invention is the provision of a digital control system in which the gain of the control is adaptive with changes in the response capabilities of the sources supplying power to the network.

For carrying out the above objects there is provided a digital computer for computing the distribution of the network load among the generating sources of the network, as may be required to provide economic operation, and for computing the magnitude of the control signals utilized to effect the economic distribution computed.

For the computation of the economic distribution required among the sources the measured values of the system or network conditions such as frequency and tie line interchange as well as the magnitude of the actual generation of each of the sources is periodically sampled and supplied as inputs to the digital computer facilities. The several constants which relate to the production costs associated with each of the several sources as well as the transmission losses associated with the lines interconnecting the several sources in the network are stored in the computer facilities or are provided as separate inputs of set magnitude. The digital computer makes a complete economic dispatch computation periodically in accordance with the sampled values of the measured conditions and the particular constant associated with the network. This complete economic dispatch computation provides accurate values for the desired generation for each of the sources since it is based upon the transmission losses of the network as well as the production costs of the sources. These desired values are then compared with the sampled actual values of generation for the sources and the difference or required change in generation is utilized as a basis for deciding which of the sources shall receive control signals and in what direction control shall be allowed to take effect.

In order to minimize the amount of time which is consumed in the control of the network a complete economic dispatch computation is made only at intervals which may be relatively long, for example, every five minutes or when load changes exceed a certain value. Proper economic distribution of load in a power network, however, requires that more frequent computations be made. In this connection the present system periodically makes a simplified computation which serves to update the complete economic dispatch computation. This updating computation being simpler in character can be made in a very short period of time in comparison with the time required for the complete economic dispatch computation and is therefore conservative of the computer's time. Such an updating computation may, for example, be made every two seconds or when load changes exceed a certain value. The updating computation provides a corrected value for the desired generation of each of the sources based upon the change in network load and the source production costs. These values are compared with the sampled values of the actual generation for each of the sources and the difference or required change in generation is utilized to determine the sense of the control which will be effected on the particular sources.

The digital computer also is utilized to determine the magnitude of the control signals so that the control signals calling for a raise in the generation will be related to the capacity of the sources which are available for a raise in generation. Likewise, the gain of the control for the signals calling for a lowering of generation are determined in accordance with the capacity for change in that direction.

To effect a permissive type of control of the source outputs, the computed required changes in generation are utilized to determine which of the sources receive the "raise" or "lower" signals. The signals are supplied as pulses with their length being computed in accordance with the error and the generating capacity available for changes in that direction.

The present invention will be more easily understood by reference to the following description and drawings in which the drawing is a block diagram of the computing and control system.

With reference to the drawing the power distribution network 10, which may also be referred to as a power system or as an area, is shown as comprising two separate stations, one having a bus 12 and the other having a bus 14. The bus 12 is provided with power from generator $G_1$ by way of line 16 while the bus 14 is provided by power from generator $G_2$ by way of line 18. Busses 12 and 14 are interconnected by transmission lines 20 and 22 which may be relatively long lines and therefore a source of transmission losses of significant magnitude.

The load on the network 10 is represented by the load $L_1$ connected to bus 12 and the load $L_2$ connected to bus 14. Generator $G_1$ is shown as being driven by turbine 28 under the control of governor 30, which is effective to vary the opening of valve 32 in the steam line 33 leading to turbine 28. The governor 30 is adjusted by governor motor 36, which is subject to being moved in either a "raise" or "lower" direction depending upon whether or not the "raise" winding 40 or the "lower" winding 42 is energized. Similarly generator $G_2$ is driven by turbine 46 which is under the control of governor 48 which adjusts valve 50 in the steam line to turbine 46. The governor 48 is adjusted by governor motor 54 in either a "raise" or "lower" direction depending upon whether or not the "raise" winding 56 is energized or the "lower" winding 58 is energized.

The actual generation produced by generator $G_1$, which is shown as the only source connected to bus 12, is measured by wattmeter 60 while the output of generator $G_2$, which is shown as the only source connected to bus 14, is measured by wattmeter 62. The wattmeter 60 provides a signal on line 66 indicative of the generation $P'_{g1}$ of generator $G_1$ while wattmeter 62 provides a signal $P'_{g2}$ on line 68 indicative of the generation of generator $G_2$.

In addition to wattmeter 62 there is also connected in line 18 a frequency meter 70 which provides on line 72 a signal $f'$ indicative of the frequency at which power is being provided in network 10.

The network 10 is shown as having a single tie line (TL) 78 connecting the network 10 to another network, not shown. Tie line 78 is shown as being connected from bus 12. The power transferred over tie line 78 is measured by wattmeter 80 which provides a signal $P'_{tL}$ on line 82 indicative of the tie line interchange from network 10 to the other network to which it is connected.

In most cases in which power distribution networks are interconnected with other power distribution networks the control of the individual networks is desirably effected so as to economically divide the load of the particular area for which the network provides power among the sources in that area while maintaining the desired preset frequency and the desired preset net interchange of power for the tie line between the particular network under control and other networks. Any deviation from this desired condition calls for a control action by the control system. For this purpose there must be computed an error signal $E'$ indicative of the magnitude of the control action which must be taken to maintain the desired network conditions of frequency and tie line interchange. For this computation there is provided an area requirement computer 90 which may be a specialized digital computer capable of periodically sampling the measured values of the frequency $f'$ and tie line interchange $P'_{tL}$ provided as input signals to computer 90 on lines 72 and 82 respectively.

Other input signals which are required by computer 90 are the set value of the frequency $f_0$ and the set value of the tie line interchange $P_{tL0}$ as well as a frequency bias $b_f$ whose value is indicative of the characteristics of the generation and load of the network. These set inputs of frequency, tie line interchange and frequency bias are shown as being inserted as inputs to the top of computer 90 in the drawing. They may also be stored values in the computer. With the sampled values of frequency and tie line interchange with the set values of frequency, desired tie line interchange and frequency bias; the area requirement computer 90 computes a value $E'$ of area control error in accordance with the following well known equation:

$$E' = P_{tL0} - P'_{tL} + b_f(f_0 - f') \qquad (1)$$

As previously mentioned the disclosed computing and control system makes a complete economic dispatch computation periodically after relatively long intervals or large load changes. During these relatively long intervals less accurate updating computations are made. These updating computations are, of course, made after shorter intervals and, being less complicated, they take less computer time. For the purposes of the drawing it may be assumed that the system is operating in the interval between complete economic dispatch computations and therefore the existing values such as the area control error $E'$ represent values computed from the last sampled measurements, that is those to be used for an update computation. All of the symbols representing signals which are shown with the prime (') indication represent those signals produced at the last sampling period, namely, after the last complete economic dispatch computation whereas the same signals which do not carry the prime (') designation represent the signals which were produced at the time of the previous computation, namely, the complete economic dispatch computation.

The complete economic dispatch computation is effected by the economic dispatch computer 100 which receives a set of signals including the signals $F_1$ and $F_2$ indicative of the slopes of the incremental production costs curves for the generator $G_1$ and $G_2$, respectively. This set of signals also includes the signals $B_{11}$, $B_{12}$, $B_{21}$ and $B_{22}$ which are indicative of constants determined by the transmission losses associated with the power generated by the respective generator $G_1$ and $G_2$, one with respect to the other. The constants which this set of signals represents may be incorporated as stored in information in computer 100.

In addition to the above mentioned set of signals computer 100 is also supplied with signals from lines 66 and 68 which are indicative of the output of the sources $G_1$ and $G_2$, respectively.

The economic dispatch computer 100 also receives as an input signal the tie line interchange as measured by wattmeter 80 and supplied as a signal over line 82. Still another signal required for the economic dispatch computation is the area error signal $E$ which is supplied by way of line 104 which is connected to the output line 92 from area requirement computer 90.

A theoretical discussion of the complete economic dispatch computation as it has been carried out in the past by analog computing means may be found in U.S. Patent 2,836,730 issued to E. D. Early on May 27, 1958 as well as in U.S. Patent 2,836,731 issued to W. G. Miller, Jr. on May 27, 1958.

The complete economic dispatch computation consists of the solution of the following equations.

$$P_L = \sum_i \sum_n P_i B_{in} P_n \qquad (2)$$

$$P_{di} = K_{i1}\frac{\partial P_L}{\partial P_{d1}} + K_{i2}\frac{\partial P_L}{\partial P_{d2}} \qquad (3)$$

$$\rho_i = \frac{1}{F_i}\frac{1}{\sum 1/F_i} \qquad (4)$$

where:

$P_L$ = total transmission loss,
$P_i$ = power output of source $i$,
$P_n$ = power out of source $n$,
$B_{in}$ = constant dependent on transmission line losses,
$P_{di}$ = the desired generation of the $i$th generator or source,
$K_{i1}$, $K_{i2}$ = constants derived from $B_{in}$ as in the manner set forth in U.S. Patent 2,836,731, in which patent the Equations 4, 5, and 6 are transformed into Equations 7, 8, and 9 and in which the constants K correspond to the constants $K_{i1}$ and $K_{i2}$ in the present computation,
$\rho i$ = the normalized participation factor based on the slope of the incremental cost curve of source $i$,
$F_i$ = the slope of the incremental production cost curve for the source $i$.

The digital computer 100 by utilizing its input signals and by computing in accordance with Equations 2, 3, and 4 produces output signals on lines 110 and 112 which are respectively representative of the desired generation for generators $G_1$ and $G_2$. These signals are symbolically represented by the reference characters $P_{d1}$ and $P_{d2}$. As shown in FIG. 1 these signals are introduced into the digital storage section 114.

Other outputs of the economic dispatch computer 100 are the values of $\rho_1$ and $\rho_2$ which are present as signals on lines 116 and 118, respectively, from which they are sent to the storage section 114 for future use.

In addition to these computed outputs from the economic dispatch computer 100 the outputs provided on lines 120 and 121 are respectively representative of the actual generation values of generators $G_1$ and $G_2$ as sampled just prior to the complete economic dispatch computation. These values are stored in storage section 114 as is the area error E which is the value which was supplied on line 104 to the economic dispatch computer 100 just prior to the economic dispatch computation. This value is sent to storage section 114 by way of line 130.

The respective computed values for the desired generation from the source $G_1$ and $G_2$ are supplied as inputs to the generation requirement computer 140 by way of lines 142 and 144, respectively. In the generation requirement computer 140 the values $P_{d1}$ and $P_{d2}$ are compared with the respective values of $P_{g1}$ and $P_{g2}$ which are supplied on lines 66 and 68, respectively. Thus, the output of the generation requirement computer, namely, $\Delta P_1$ and $\Delta P_2$ on lines 150 and 151 are computed in accordance with the following equation.

$$\Delta P_i = P_{di} - P_{gi} \qquad (5)$$

Each of the output lines 150 and 151 are inputs to relay setting circuits 154 and 156, respectively. Each of these relay setting circuits is responsive to the signal on its input lines which is indicative of the change in generation required of the particular source and the relay setting circuit then produces an output signal on its output line 158 and/or 160. The signal on line 158 provides an input to operate the routing relays $R_1$ and $L_1$ shown as block 162 while the output on line 160 is an input to operate routing relay $R_2$ and $L_2$ shown in block diagram form as block 164.

Another input to the routing relay is the control signal $\Delta T$ which is a pulse whose length $\Delta T$ is determinative of the amount of control action to be taken. This pulse is supplied from a pulse generator 170 on an output line 172 which branches into separate output lines 173 and 174 to provide input to the routing relays 162 and 164, respectively. The outputs of the routing relays are shown as being on lines 180 and 182 from routing relays 162 and on lines 186 and 188 from the routing relays 164.

The operation of the relay setting circuits 154 and 156 and the respective routing relay circuits 162 and 164 will now be described. When the signal $\Delta P_1$, appearing on line 150, calls for a raise in the output of source $G_1$, that is a change in its generation in an increase direction, the relay setting circuit 154 sends a signal on line 158 to set the routing relay $R_1$ which serves to connect any "raise" pulses appearing on line 173 through the routing relay $R_1$ onto line 180 which leads to the raise winding 40 of governor motor 36 so as to effect, in response to the pulse $\Delta T$, a resetting of the governor 30 to increase the output of source $G_1$. When the signal on line 150 calls for a decrease in generation the signal which is produced on line 158 by the setting circuit 154 causes the routing relay $L_1$ to connect any control pulse $\Delta T$ calling for a decrease from line 173 through to line 182 which connects to the lower winding 42 of governor motor 36 so as to affect an adjustment of governor 30 to cause a decrease in the output of generator $G_1$.

In similar fashion the signal $\Delta P_2$ on line 151 can by way of setting circuit 156 cause a signal on line 160 to set either routing relay $R_2$ or routing relay $L_2$ to respectively connect the control pulse $\Delta T$ from line 174 to line 188 or 186, respectively. When the signal is connected to line 188 the pulse then goes to the lower winding 58 of governor motor 54 so as to cause the governor 48 to affect a decrease in the output of source $G_2$. On the other hand if the signal from line 174 is connected to line 186 by routing relay $R_2$ the signal then appears in "raise" winding 56 of motor 54 to cause the governor 48 to increase the output of generator $G_2$. The specific manner in which the pulse $\Delta T$ is generated will be described subsequently.

During the period between complete economic dispatch computations the generators $G_1$ and $G_2$ are controlled in accordance with updated calculations of the desired economic distribution of generation between the two sources. The updating calculations themselves are made by the limit compensation computer 200 in conjunction with the economic dispatch updating computer 202.

The limit compensation computer 200 provides computations in accordance with the following equations:

$$\rho'_i = \frac{\rho_i}{1 - \Sigma_i \rho_i[0]} \qquad (6)$$

$$\Delta P[H] = \Sigma_i(H_i - P_{di}) \; i = \text{units with} P_{gi} < H_i \text{ and } P'_{gi} > H_i \qquad (7)$$

$$\Delta P[L] = \Sigma_i(L_i - P_{di}) \; i = \text{units with} P_{gi} > L_i \text{ and } P'_{gi} < L_i \qquad (8)$$

where $\rho_i[0]$ = participation factor for controlling sources at their limits.

In order to carry out these computations the limit compensation computer 200 receives as inputs from the storage section 114 the values $\rho_1$, $\rho_2$, $P_{g1}$ and $P_{g2}$ as well as $P_{d1}$ and $P_{d2}$. These signals are supplied on the respective lines 201–206. Other inputs supplied include the actual generation values $P'_{g1}$ and $P'_{g2}$ as sampled at the time the update calculation is to be made as well as a set of signals or stored constants $H_1$ and $H_2$ representing the set high limits for $G_1$ and $G_2$ and signals $L_1$ and $L_2$ representing the set lower limits of generation of those sources.

The computation carried out by the economic dispatch updating computer 202 is set forth in the following equation:

$$P'_{di} = P_{di} + \rho i(\Sigma P'_{gi} + E' - \Sigma P_{gi} - E - \Delta P[H] - \Delta P[L]) \qquad (9)$$

As will be evident from the above equations the outputs from the limit compensation in computer 200 on lines 210, 212, 214 and 216 are utilized as inputs to the economic dispatch updating computer 202. Other inputs which are required and are shown as being introduced into the economic dispatch updating computer 202 are from lines 205 and 206, each of which represents the desired generation as computed for one of the generating sources during the last complete economic dispatch computation by computer 100 and which was stored during the period between the last complete economic dispatch computation and the present updating computation in the storage section 114. An additional input to economic dispatch updating computer 202 is on line 220. This input represents the area error E which existed at the time of the complete economic dispatch computation and which was stored in the storage section 114 prior to the start of the updating computation.

Also the existing area error E′ is introduced into the economic dispatch updating computer 202. This error signal is introduced on line 222 and represents an area control error which was computed from measurements sampled just prior to the update computation.

In addition to the inputs already mentioned, lines 66 and 68 also provide inputs to the economic dispatch updating computer 202 of the values $P'_{g1}$ and $P'_{g2}$ representing the sampled values of the existing actual generation of generators $G_1$ and $G_2$, respectively.

The computation carried out by the economic dispatch updating computer 202 produces the output quantities $P'_{d1}$ and $P'_{d2}$ on the lines 230 and 232, respectively. These output lines become inputs to the generation requirement computer where the signals are compared with the signals from lines 66 and 68 in accordance with the following equation:

$$\Delta P_i = P'_{di} - P'_{gi} \quad (10)$$

There is thus determined the change in generation required of each of the sources to provide for the economic distribution of the load in the network 10 as computed by the updated computation. The signals on lines 150 and 151 which are outputs of the generation requirement computer 140 provide a control of the governor motors 36 and 54 in response to the updating computation in the same manner as was previously described for the control of those governor motors in response to the complete economic dispatch computation.

As was previously mentioned there is produced by pulse generator 170 on line 172 a pulse $\Delta T$ representing the magnitude of the control effect which is to be produced. The pulse may be considered as having a length $\Delta T$. The pulse length computer 250 determines the pulse length. One of its inputs is the area error E′ from line 92, the other inputs are the set quantities $K_1$, $K_2$, $Rc_1$ and $Rc_2$. These set quantities may, of course, be stored values in the computer. The K constants represent a gain adjustment for the control circuit, which gain adjustments are to be modified by other relative gain adjustments $k_L$ and $k_R$, to be described subsequently.

The R constants represent the reset adjustments for the controller, as will be evident from the equations by which the pulse length computer 250 computes its output values. The inputs $k_L, k_R$ which appear on lines 252 and 254, respectively are derived from the gain computer 258. The pulse length computer itself produces an output signal representing $\Delta T$ on line 260 in accordance with the following equation:

$$\Delta T = Kk[E'_n - E'_{n-1} + R_c E'_n] \quad (11)$$

where:
$E'_n$ is the error from the present sampling.
$E'_{n-1}$ is the error from the last sampling.
$K$=constant based on controlling capacity and controller gain.
$k$=relative gain adjustment for "raise" or "lower" control.

The signal representing $\Delta T$ on line 260 is introduced into accumulator 262 which is effective to accumulate the signals sent on line 260 until the magnitude $\Delta T$ accumulated represents a sufficient magnitude to warrant the sending of the control signals to the governor motors. At that time the accumulator 262 generates an output on line 264 which energizes the pulse generator 170 so as to produce an output pulse on line 172 $\Delta T$ representative of the accumulated values of $\Delta T$. The sense of the control action is determined by the sense of $\Delta T$ in Equation 11. Therefore, there appears as an output from pulse length computer 250 a "raise" signal R on line 270 or a "lower" signal L on line 272, depending upon the sense of $\Delta T$. The signals on lines 270 and 272 indicate the particular channel to be used, that is whether the pulse $\Delta T$ is to be introduced into the "raise" or "lower" channel. For the purpose of illustration, the line 172 and the lines 173 and 174 are shown as single lines. However, they would normally constitute two lines, the one carrying the impulses intended to control for the "raise" direction and another carrying the impulses intended to control for the "lower" direction. One or the other of those lines would be connected to carry the pulse $\Delta T$, depending upon which of the signals R or L appear on line 270 or 272, respectively.

The gain computation, that is the computation of $k_L$ and $k_R$ as accomplished by a gain computer 258 is made when there is an update computation being made. The inputs to the gain computer 258 include the signals on lines 150 and 151 as well as the values $P_{o1}$ and $P_{o2}$, which respectively represent the response of the first and second generators $G_1$ and $G_2$ to a control signal. These particular quantities may be in terms of megawatts per second, for example. The gain computation accomplished by computer 258 is then in accordance with the following equations:

$$k_L = \frac{\sum P_{oi}[c]}{\sum P_{oi}[L_i]} \quad (12)$$

$$k_R = \frac{\sum P_{oi}[c]}{\sum P_{oi}[R_i]} \quad (13)$$

where:
$P_{oi}[c]$=rate of response of the $i$ sources which are controlling.
$P_{oi}[L_i]$=rate of response of the $i$ sources which are available for "lower" pulses.
$P_{oi}[R_i]$=rate of response of the $i$ sources which are available for "raise" pulses.

The previous description has been in terms of utilization of separate digital computers for each of the specific blocks labeled in the drawing as computers. It will be evident to those skilled in the art that a general purpose computer with the flexibility usually present in such devices could adequately handle all of the computations previously described. With such a computer the various constants could be stored in the computer and the only external inputs necessary would be sampled values of the several measurements such as the actual generation of each source, the frequency, and the tie line interchange.

Certain of the computers shown as block may also be advantageously constructed as analog units. For example, the area requirement computer 90 could be a device of the type disclosed in U.S. Patent 2,688,728, issued to J. B. Carolus on Sept. 7, 1954.

What is claimed is:
1. A load control system comprising:
   means for establishing a signal indicative of the frequency of the power generated by power sources interconnected to form a distribution network,
   means for establishing a signal indicative of the power interchanged between said network and other networks,
   means for establishing signals indicative of the desired values for said frequency and said interchange,
   means for establishing signals indicative of the frequency characteristic of said network,
   means for establishing separate signals indicative of the generation from each source connected to said network, digital computer means responsive to each of the above said signals and operative to compute the desired generation for each of said sources to maintain the said desired values of frequency and tie line interchange, said computer means being operative to make a complete economic dispatch computation which takes into account both source production costs and transmission losses to compute said desired generation values accurately after each of first predetermined periods of time and periodically to make between said complete economic dispatch computation a less complete updating economic dispatch computation which only takes into account source production costs.

means for controlling said sources to produce changes in generation in accordance with said computed desired generation values established by said complete and said updating computations, said control being effected only when said network is not generating the power required for the desired frequency and existing load on said network.

2. A load control system as set forth in claim 1 in which said updating computation is based upon the desired generation values computed by the previous complete economic dispatch computation and a fractional part of the change in load as determined by a participation factor since the previous complete economic dispatch computation, said participation factor being computed by the digital computer at the time of the complete economic dispatch computation as a function of the slope of the incremental production cost curves of the generating sources, said participation factor being modified at the time of said update computation to compensate for sources which have reached a predetermined limit value.

3. A load control system for power sources interconnected to form a load distribution network comprising:

means for establishing a first set of signals including:
(1) a signal indicative of a sampled value for the frequency of the power generated by said power sources,
(2) a signal indicative of a sampled value for the net power interchanged between said network and other networks over interconnecting tie lines,
(3) a signal indicative of the desired frequency,
(4) a signal indicative of the desired value of said net power interchanged,
(5) a bias signal indicative of the frequency-generation characteristic of said network;

means for establishing a second set of signals including:
(1) separate signals each indicative of the slope of the incremental production cost curve for a particular one of said sources,
(2) separate signals each indicative of a constant determined by the transmission losses associated with power generated by a particular source of said network with relation to the power generated by another of said sources,
(3) separate signals each indicative of sampled values of the actual generation from a different one of said sources;

means for establishing a third set of signals including:
(1) a separate signal for each power source indicative of the gain desired in the response of said control system,
(2) a separate signal for each power source indicative of the reset response desired in said control system;

means for establishing a fourth set of signals including:
(1) a separate signal indicative of the high limit for each of said sources,
(2) a separate signal indicative of the low limit for each of said sources;

means for establishing a fifth set of signals including separate signals each indicative of the rate of response of the particular source of control signals;

digital computer means responsive to each of the above mentioned signals and operative to periodically compute the required change in generation for each of said sources for distributing the load of said network economically among the said sources and to periodically compute control signals for effecting said required change, said generation change computation being operable to compute at predetermined ones of said periods a complete economic dispatch computation including:
(1) computation, from said first set of signals of an area control error signal indicative of the deviation of the generation of the sources of said network at said periods from the load of said network at said periods based on the desired frequency and the desired interchange,
(2) computation, from said second set of signals and said area control error signal, of the desired generation for each of said sources and a participation factor for each of the sources of said network which represents the fractional part of the total incremental production cost associated with each of said sources, and to store said area control error signal, said desired generation values, said participation factors and the sampled actual generation values upon which said computed desired generation values are based; and to compute at other periodic intervals between said periods for complete economic dispatch computations updating computations including:
(1) computation, from said fourth set of signals, signals representing sampled values of existing actual generation sampled at the time for updating and those of said stored signals other than said area error signal, of updated values for said participation factors compensated for the sources whose generation has reached one of said limits,
(2) computation of modifying signals, from said fourth set of signals and said stored values for the desired generation of each of said sources, of the difference between said values for those sources which have reached one of said set limit values since the previous complete economic dispatch computation,
(3) computation of an updated value for said desired generation for each of said sources by summing the stored value for the desired generation for each source and an updated fractional, participation factor representing that part of the total change in load on said network for each source minus said computed modifying signals;

and to compute from the last sampled value for actual generation of each source and the last computed value for desired generation the said required change in generation for each of said sources, said control signal computation being operable to compute the duration of a control pulse as said control signal, said control pulse computation including:
(1) a relative controller gain computation for the sources which can accept control pulses for effecting changes in generation in each of the raise and lower directions, said last named computation being a ratio of the rate of response of the network sources under control to the rate of response of those sources which can correct for the area control error by accepting pulses for a particular direction of control action,
(2) computation of the duration of said pulse and the direction desired for the control action in response to the updated area error value, said third set of signals and said relative controller gains;

means for generating control pulses in accordance with said duration computations; and means for routing said pulses to change the governor settings of the sources requiring generation changes of the sense of said pulses to thereby correct the load distribution in said network.

4. A load control system for a power distribution network comprising:

means for establishing an area control error signal indicative of the deviation of the generation of said network from that amount required to maintain a set frequency in said network, means for eshablishing separate generation signals indicative of the generation of individual sources in said network, digital computer means for periodically computing desired values for the generation of said sources in response to first sampled values of said area control error signal and said generation signals and in accordance with constants indicative of the production costs of said sources and the transmission losses in said network, means for storing the sampled area control error and generation signals sampled for said computation and the desired generation values computed, digital computer means for periodically updating said computed desired values for the generation of said sources at intervals in the periods between said periodic computations, said updating computation being operative to compute new values for the desired generation of said sources in response to later sampled values for said area control error and said generation signals and in accordance with constants indicative of the production costs of said sources, said stored area control error, generation signals and desired generation values as previously computed, means for comparing signals indicative of the computed values of desired generation with said actual generation signals to establish signals indicative of the required change in generation of said sources, means responsive to the change in said area control error between said first and said later sampling to establish control signals depending upon said change, means responsive to said generation change signals to direct said control signals to those of said sources requiring a change in generation of the sense required to correct for the change in said area control error.

5. A load control system for a power distribution network comprising:

means for establishing a signal indicative of the frequency of the power generated by power sources of said network, means for establishing signals indicative of the desired values for said frequency and said interchange, means for establishing a signal indicative of the frequency characteristic of said network, means for establishing separate signals indicative of the generation from each source connected to said network, digital computer means responsive to each of the above mentioned signals and operative at intervals to compute the required change in generation of each of said sources to accommodate load changes in the network as indicated by a combined value of said desired frequency and interchange and said network frequency characteristic, those of said computations made after a predetermined number of said intervals, being complete economic dispatch computations taking into account both the production costs of said sources and the transmission losses in said network, said computations at intervening intervals being made by updating the values computed by said complete computation in accordance with changes in said signals since the last of said complete computations and the production costs of said sources, means for controlling the generation of said sources to tend to reduce said computed required changes in generation toward zero when said signals indicate a deviation of said frequency and interchange from their desired values such that a change of load on said network is indicated.

6. A load control system as set forth in claim 5 in which said means for controlling the generation includes a source of control pulses and means for adjusting the duration of said pulses in accordance with the change in the area control error computed from measured changes in the values of said signals during said intervals.

7. A load control system as set forth in claim 5 in which said means for controlling the generation includes a source of control pulses and means for adjusting the duration of said pulses in accordance with one proportion of the change in the area control error as computed from measured changes in the values of said signals during said intervals and in another proportion to the area control error at the end of said interval.

8. A load control system as set forth in claim 7 in which said one and said other proportions are varied in accordance with the rate of response of those of said sources subject to control.

9. A load control system as set forth in claim 5 in which said complete economic dispatch computation includes a computation of a participation factor for each source in accordance with relative slopes of the production cost curves on which said sources are operating, said participation factors being stored for use in said updating computation as factors for introducing said production costs.

10. A load control system as set forth in claim 9 in which said participation factors are varied in accordance with the production costs of those sources which have reached a preset limiting value of generation.

11. A load control system for a power distribution network comprising:

means for measuring the frequency of said network, means for measuring the generation of the sources in said network, digital computer means operable at periodic intervals to sample said measurements and to compute the desired generation for each of said sources required for an economic distribution of the load of said network at a desired frequency, said computation taking into account both the production costs of each of said sources and the transmission losses in the network, said digital computer also being operable at intermediate intervals between said periodic intervals to update the computations of desired generation made at a previous periodic interval, said updating calculation taking into account production costs of said sources and omitting calculations accounting for changes in the transmission losses since the said previous periodic interval.

12. A load control system for a power distribution network comprising:

means for establishing a signal indicative of the frequency of the power generated by power sources of said network, means for establishing signals indicative of the desired values for said frequency, means for establishing separate signals indicative of the generation from each source connected to said network, digital computer means responsive to each of the above mentioned signals and operative to compute the required change in generation of each of said sources to economically accommodate load changes in said network as evidenced by changes in said frequency signal and to produce control signals for effecting said required changes, said control signals being variable in accordance with gain factors computed as the relationship between the total capacity of the sources of said network to that part of said capacity which can change its generation in a direction to correct the frequency while more nearly approaching the desired value of generation as computed for said economic accommodation of said load.

References Cited

UNITED STATES PATENTS

| | | |
|---|---|---|
| 3,229,110 | 1/1966 | Kleinbach et al. |
| 3,117,221 | 1/1964 | Kirchmayer ____ 235—151.21 X |
| 2,836,731 | 5/1958 | Miller. |
| 2,836,730 | 5/1958 | Early. |

ROBERT K. SCHAEFER, *Primary Examiner.*

H. J. HOHAUSER, *Assistant Examiner.*

UNITED STATES PATENT OFFICE
CERTIFICATE OF CORRECTION

Patent No. 3,405,279                          October 8, 1968

Charles W. Ross

It is certified that error appears in the above identified patent and that said Letters Patent are hereby corrected as shown below:

Column 8, line 71, "signals" should read -- a signal --. Column 9, lines 11 and 12, "computation" should read -- computations --. Column 10, line 3, "of control" should read -- to control --.

Signed and sealed this 24th day of February 1970.

(SEAL)
Attest:

Edward M. Fletcher, Jr.                WILLIAM E. SCHUYLER, JR.
Attesting Officer                           Commissioner of Patents